United States Patent
Kinstle et al.

(10) Patent No.: US 6,395,241 B1
(45) Date of Patent: May 28, 2002

(54) PROCESS FOR RECOVERING THE CARBIDE METAL FROM METAL CARBIDE SCRAP

(75) Inventors: George P. Kinstle, Hinckley; Alex T. Magdics, Highland Hts., both of OH (US)

(73) Assignee: OM Group, Inc., Cleveland, OH (US)

( * ) Notice: Subject to any disclaimer, the term of this patent is extended or adjusted under 35 U.S.C. 154(b) by 0 days.

(21) Appl. No.: 09/706,496

(22) Filed: Nov. 3, 2000

(51) Int. Cl.$^7$ .................. C01G 37/14; C01G 31/00; C01G 23/00; C01G 41/00; C01G 39/00
(52) U.S. Cl. .................. 423/61; 423/62; 423/71
(58) Field of Search .................. 423/61, 62, 71, 423/68, 55, 53, 58, 150.3

(56) References Cited

U.S. PATENT DOCUMENTS

| | | | |
|---|---|---|---|
| 2,704,240 A | * 3/1955 | Avery | |
| 3,256,058 A | 6/1966 | Burwell | 23/15 |
| 3,887,680 A | 6/1975 | MacInnis et al. | 423/55 |
| 3,953,194 A | 4/1976 | Hartline, III et al. | 75/5 |
| 4,255,397 A | 3/1981 | Martin et al. | 423/61 |
| 4,256,708 A | 3/1981 | Quatrini | 423/61 |
| 4,533,527 A | 8/1985 | Farrell et al. | 423/53 |
| 4,629,503 A | 12/1986 | Fruchter et al. | 75/121 |
| 5,993,756 A | 11/1999 | Lohse | 423/1 |

OTHER PUBLICATIONS

E. Lassner and B. Kieffer; Tungsten Recycling with Special Regard to Cemented Carbide Industry; pp. 5–1—5–7.

E. Lassner; From Tungsten Concentrates and Scrap to Highly Pure Ammonium Paratungstate (APT); pp. 35–44.

* cited by examiner

*Primary Examiner*—Steven Bos
(74) *Attorney, Agent, or Firm*—Renner, Otto, Boisselle & Sklar, LLP

(57) ABSTRACT

The process of the present invention relates to a process for recovering the carbide metal from metal carbide scrap wherein the metal is tungsten, titanium, vanadium, chromium or molybdenum, and this process comprises (A) providing a mixture comprising the metal carbide scrap and at least a stoichiometric amount, based on the amount of carbide metal present in the scrap, of an alkali metal hydroxide, (B) heating the mixture in the presence of oxygen at an elevated temperature and pressure for a period of time sufficient to form a water soluble alkali metal salt of the carbide metal, and (C) recovering the water soluble alkali metal salt.

25 Claims, No Drawings

PROCESS FOR RECOVERING THE CARBIDE METAL FROM METAL CARBIDE SCRAP

FIELD OF THE INVENTION

This invention relates to a process for recovering the carbide metal from metal carbide scrap. More particularly, the invention relates to an improved process for recovering tungsten from tungsten carbide scrap.

BACKGROUND OF THE INVENTION

Cemented carbide tools are made from mixtures comprising extremely hard and extremely fine metal carbide particles together with a suitable binder or cement. Examples of such tools include those tools made of tungsten carbide cemented with an iron group metal such as iron, nickel, chromium, molybdenum, or cobalt. Cobalt is the most widely used cementing material. Since all of the materials used in the operation of cemented carbides are very valuable, it is desirable to reclaim the materials whenever possible.

Metal carbide scrap material is available in two basic forms. Soft scrap material is referred to in the industry as that material which has not been sintered, and, therefore, soft scrap material may be material which has been manufactured and found to deviate from accepted specifications, or waste material which is produced during the fabrication of articles. Soft scrap may contain from about 10% to about 98% of the desired metal. Hard metal carbide scrap consists of solid sintered pieces which may be rejected or used pieces of tools and other objects which have been disintegrated into pieces for reclaiming the valuable metals. Various proposals have been made for recovering the valuable carbide metal such as tungsten from each type of scrap. Both the soft scrap and the hard scrap metal carbides are generally referred to in the industry as secondary tungsten materials.

Various processes have been suggested for reclaiming the desirable metal from the secondary metal carbide scraps, and chemical processing (and direct recycling methods) of the metal carbide scrap materials are most often utilized to recycle and recover the carbide metal. The chemical conversion processes include many different steps and results in a highly pure final product which is either ammonium metatungstate (AMT) or ammonium paratungstate (APT). The present invention relates to the initial treatment of the metal carbide scrap.

U.S. Pat. No. 3,887,680 (MacInnis et al) describes a process where tungsten carbide containing an iron group metal such as cobalt is oxidized to a friable oxidation product. The oxidation product is then ground and treated by digesting it in an aqueous solution of an alkali metal hydroxide under controlled conditions to recover tungsten values.

U.S. Pat. No. 3,953,194 (Hartline et al) describes a process for reclaiming cemented metal carbide scrap by subjecting the scrap to a four stage process which involves: a catastrophic oxidation of the scrap at temperatures of at least 1100° F. in the presence of oxygen to convert the metal carbide to metal oxide; subdividing the metal oxide to a powder; reducing the metal oxide powder with a reducing gas to reduce the oxygen content of the powder to a maximum of 0.5% by weight; and carburizing the reduced powder by subjecting it to available carbon to convert the metal to metal carbide.

U.S. Pat. No. 4,256,708 (Quatrini) describes a process for recovering tungsten from cemented tungsten carbide wherein the carbide is oxidized to form an oxidized product that is digested in an aqueous solution of an alkali metal hydroxide to form a water soluble alkali metal tungstate portion and an insoluble portion. The patentee indicates that the recovery of tungsten values is improved when the insoluble portion is digested in an aqueous alkali metal hydroxide solution with a suitable amount of titanium dioxide which promotes the formation of a soluble alkali metal tungstate.

U.S. Pat. No. 4,255,397 (Martin et al) describes an improvement in the process for recovering tungsten from tungsten carbide scrap which utilizes a long oxidation period followed by digestion and sodium hydroxide to form a water soluble alkali metal tungstate and a water insoluble portion which is believed to be a complex cobalt tungstate. It is suggested in the '397 patent that the oxidation step can be reduced in time and desirable tungsten can be recovered from the water insoluble portion containing the complex cobalt tungstate by mixing the insoluble portion with an alkali metal carbonate and roasting the mixture in an atmosphere containing oxygen below the fusion temperature of the mixture. The resulting oxidized product is leached with water so that substantially all of the tungsten values initially present are recovered in the process.

SUMMARY OF THE INVENTION

The present invention relates to a process for recovering the carbide metal from metal carbide scrap wherein the metal is tungsten, titanium, vanadium, chromium or molybdenum, and this process comprises (A) providing a mixture comprising the metal carbide scrap and at least a stoichiometric amount, based on the amount of carbide metal present in the scrap, of an alkali metal hydroxide, (B) heating the mixture in the presence of oxygen at an elevated temperature and pressure for a period of time sufficient to form a water soluble alkali metal salt of the carbide metal, and (C) recovering the water soluble alkali metal salt.

DESCRIPTION OF THE PREFERRED EMBODIMENTS

The present invention may be considered as an improvement in the basic processes described in U.S. Pat. No. 3,887,680 to MacInnis et al. According to the processes described in the '680 patent, scrap tungsten carbide is oxidized in air at a temperature preferably from about 825° C. to about 850° C. The oxidized cemented tungsten carbide product thus obtained is thereafter ground to a powder form, charged to an aqueous solution of an alkali metal hydroxide, and heated under pressure for several hours. A water soluble alkali metal tungstate and an insoluble iron group metal product are obtained thereby allowing a separation of the tungsten values from the iron group metals. One of the differences between the process of the present invention and the process described in the '680 patent is that, in the present invention, a mixture of the metal carbide scrap (not the oxidized scrap) and an alkali metal hydroxide, optionally in the presence of water, is heated to an elevated temperature and pressure in the presence of oxygen to form the desired water soluble alkali metal derivative of the carbide metal (e.g., sodium tungstate). Using tungsten carbide scrap cemented with cobalt as an example, the reaction may be represented as follows:

$$WC + Co + 2NaOH + 3O_2 \rightarrow Na_2WO_4 + Co(OH)_2 + CO_2$$

The sodium tungstate is soluble in water while the cobalt hydroxide is insoluble in water.

The process of the present invention may be utilized for recovering carbide metals from metal carbide scraps such as tungsten carbide scrap, titanium carbide scrap, vanadium carbide scrap, chromium carbide scrap, and molybdenum carbide scrap. In one embodiment, the process is useful for recovering tungsten, titanium, vanadium, chromium and molybdenum from carbide scraps containing such metals wherein the metal carbides are cemented metal carbides. Cobalt is the most widely used cementing material although other cementing materials such as iron, nickel, chromium, and molybdenum have been utilized. In one embodiment, the cementing materials are the iron group metals including iron, nickel and cobalt.

The process of the present invention can be carried out on either soft scrap or hard scrap. Soft scrap includes scrap from metal carbide compositions prior to sintering. Thus, the soft metal carbide scrap includes powders, sweeps, trimmings, and sludges of metal carbide compositions, and in particular, cemented metal carbide compositions recovered as scrap materials in the processing of the compositions into a sintered metal carbide shape such as a tool. Hard scrap includes the hard solid pieces of sintered metal carbide compositions which may include one or more of the cementing materials mentioned previously. The hard scrap pieces may be obtained either because a sintered product is off specification, or the product has become worn and is no longer useful. In the event that the process of the present invention is conducted on hard scrap, the hard scrap is broken or ground up into pieces of a size suitable for treatment in accordance with the present invention.

In one embodiment, the soft metal carbide scrap may be dried or slightly calcined prior to use in the process of the reacting. Such drying removes water and oils (e.g., cutting oils) which may have been utilized in preparing the green cemented carbides. Generally drying can be accomplished in a few hours (e.g., 1 to 2 hours) at temperatures of up to 500° C., and in one embodiment at temperatures in the range of about 300° to about 500° C. It is to be understood that here and elsewhere in the claims and specification, the range and ratio limits may be combined.

Although any alkali metal hydroxide can be used in the process of the present invention, sodium hydroxide generally is used because of its availability and cost. In one embodiment, an aqueous solution containing from about 20% to about 50% sodium hydroxide is utilized. In another embodiment, additional water is utilized in the preparation of the mixture of the scrap metal carbide and the alkali metal hydroxide. At least a stoichiometric amount of the alkali metal hydroxide, based on the amount of carbide metal present in the scrap should be incorporated into the reaction mixture to cause most of the carbide metal present in the mixture to be converted to an alkali metal salt (e.g., sodium tungstate.) In one embodiment, a molar excess of from about 50% to about 100% of the theoretical amount of alkali metal hydroxide is utilized to insure that all of the carbide metal values are converted to a soluble carbide metal form.

In the process of the present invention, the mixture of the metal carbide scrap, alkali metal hydroxide, and optionally water, is heated in the presence of oxygen at an elevated temperature and pressure for a period of time sufficient to form a water soluble alkali metal salt of the carbide metal. Temperatures which are useful include temperatures in the range of from about 100° C. to about 200° C. or higher, and more often, in the range of from about 120 to about 160° C. The pressure at which the reaction is conducted may range from about 25 to about 200 psig or from about 50 to about 125 psig. The time of the reaction may be varied over a wide range, and the time will depend at least in part on the chosen temperature and pressure. For example, the reaction at a higher temperature and pressure should not require as much time to produce a desired quantity of the water soluble alkali metal salt as when the reaction is conducted at a lower temperature and/or pressure. Generally, the mixture of metal carbide scrap, alkali metal hydroxide, oxygen, and optionally, water, is heated for a period of from about 5 to about 30 hours or from about 10 to about 30 hours, or from about 10 to about 25 hours. In one embodiment, the scrap, water, and the alkali metal hydroxide is heated in a closed reactor to the desired temperature, and the pressure rises due to vaporization of the water. Oxygen is then added to promote the oxidation reaction and to increase the internal pressure to the desired level.

The product of the reaction is a water soluble portion comprising an alkali metal salt of the carbide metal, namely, an alkali metal tungstate, vanadate, chromate or molybdate, and an insoluble portion containing the cementing metal such as cobalt. The product mixture is filtered and the filtrate is an aqueous solution of the desired salt. The residue can be washed with water to dissolve any of the soluble product entrained in the solids. Yields of recovered carbide metal are generally greater than 50%, and often above 90% by weight.

In one particular embodiment, the process of the present invention is a process for producing an alkali metal tungstate from tungsten carbide scrap which comprises (A) providing a mixture comprising the tungsten carbide scrap and at least a stoichiometric amount, based on the amount of tungsten in the scrap, of an alkali metal hydroxide, and (B) heating the mixture in the presence of oxygen at an elevated temperature and pressure for a period of time sufficient to form the alkali metal tungstate.

The following examples illustrate the process of the present invention. Unless otherwise indicated in the following examples and elsewhere in the specification and claims, all parts and percentages are by weight, all temperatures are in degrees centigrade, and all pressures are at or near atmospheric pressure. The soft tungsten carbide scrap used in Examples 1 to 11, prior to any drying contains 92.6% w solids 49.68% w of tungsten, 4.23% w cobalt, and 4.21% w carbon. The dried scrap has been heated to about 400° C. for 1 to 2 hours to remove at least some of the moisture and oil that may be present.

EXAMPLE 1

Dried soft tungsten carbide scrap (165 parts), 110 parts of an aqueous solution containing 50% sodium hydroxide, and 389 parts of water are added to an autoclave. The mixture is heated to a temperature of about 124° C., and the pressure within the reactor is increased to 120 psig as oxygen is introduced into the autoclave. The pressure from the water present in the mixture is 32 psig and the pressure from the added oxygen is 88 psig. The mixture is maintained at this temperature and pressure for 24 hours whereupon the contents of the autoclave are filtered, and the residue washed with 250 parts of water yielding 73 parts of a light grey brown solid, and 625 parts of an orange-yellow filtrate which contains 11.3% of tungsten as sodium tungstate which indicates that 95% of the tungsten in the soft tungsten carbide scrap is recovered.

EXAMPLE 2

Soft tungsten carbide scrap (179 parts), 389 parts of water and 110 parts of a 50% aqueous solution of sodium hydroxide are added to an autoclave, and the mixture is heated in the presence of oxygen for 68 hours at 140° C. under a pressure of 50 psig (45 psig water pressure, 5 psig oxygen pressure). At the end of this period, the mixture in the autoclave is filtered and washed with 250 parts of water to yield 107.9 parts of a water insoluble residue and 587 parts of a filtrate which is an aqueous solution of the desired sodium tungstate. The filtrate contains 7.97% tungsten indicating a recovery of 63% of the tungsten in the scrap.

EXAMPLE 3

Soft tungsten carbide scrap (179 parts), 110 parts of a 50% aqueous solution of sodium hydroxide, and 389 parts of water are charged to an autoclave, and the mixture is heated to 140° C. Oxygen is added until the internal pressure is 80 psig (45 psig water pressure and 35 psig oxygen pressure). The mixture is heated at 140° C. under a pressure of 80 psig for 24 hours, and at the end of this period, the contents of the autoclave are cooled and filtered, and the residue is washed with 250 parts of water yielding 89.6 parts of a residue and 822 parts of the filtrate. The filtrate contains 6.35% by weight of tungsten indicating a recovery of 70% of the tungsten in the tungsten carbide scrap.

EXAMPLE 4

Dried soft tungsten carbon scrap (165 parts), 110 parts of a 50% aqueous solution of sodium hydroxide and 389 parts of water are placed in an autoclave, and the mixture is heated to a temperature of 140° C. Oxygen is added, and the pressure air within the autoclave reaches 80 psig (45 psig water pressure and 35 psig oxygen pressure). The mixture is heated at this temperature and pressure for 24 hours whereupon the mixture is cooled, filtered, and the residue is washed with 250 parts of water yielding 76.3 parts of residue and 775 parts of filtrate. The filtrate is an aqueous solution of the desired sodium tungstate, and the filtrate contains 7.73% by weight of tungsten indicating a recovery of 79% of the tungsten contained in the tungsten carbide scrap.

EXAMPLE 5

One hundred and sixty parts of the dried soft tungsten carbide scrap, 80 parts of a 50% aqueous sodium solution of sodium hydroxide and 420 parts of water are charged to an autoclave. The mixture is heated to a temperature of 140° C., and oxygen is added to provide a total pressure of 80 psig (45 psig water pressure and 35 psig oxygen pressure). The mixture is heated at this temperature and pressure for a period of 24 hours whereupon the mixture is cooled, filtered and washed with 250 parts of water yielding a residue of 93.8 parts and a filtrate of 582 parts. The filtrate contains 10.7% tungsten indicating that 88% of the tungsten in the tungsten carbide scrap is recovered.

EXAMPLE 6

One hundred and fifty parts of dried soft tungsten carbide scrap, 100 parts of a 50% aqueous solution of sodium hydroxide (3 moles per mole of tungsten in the carbide) and 354 parts of water are added to an autoclave, and oxygen is added. The autoclave is heated to a temperature of 160° C., and the pressure within the reactor reaches 85 psig (80 psig water pressure and 5 psig oxygen pressure). The mixture is then heated at this temperature and pressure for 24 hours whereupon the mixture is cooled, filtered and washed with 250 parts of water yielding a solid residue of 74.2 parts and a filtrate of 582 parts. The filtrate contains 10.2% tungsten indicating a recovery of 85.6% of the tungsten present in the tungsten carbide scrap.

EXAMPLE 7

One hundred and seventy nine parts of soft tungsten carbide scrap, 389 parts of water and 110 parts of a 50% aqueous solution of sodium hydroxide are added to an autoclave. The mixture is heated to 160° C., and oxygen is added until the total internal pressure is 125 psig (80 psig water pressure and 45 psig oxygen pressure). The mixture then is heated at this temperature and pressure for 24 hours whereupon the mixture is cooled, filtered and washed with 250 parts of water yielding 74 parts of a dry residue and 815 parts of filtrate. The filtrate contains 9.18% of tungsten indicating recovery of 99% of the tungsten in the tungsten carbide scrap.

EXAMPLE 8

One hundred and sixty five parts of dried soft tungsten carbide scrap, 110 parts of a 50% aqueous solution of sodium hydroxide (4 moles per mole of tungsten) and 389 parts of water are added to an autoclave which is heated to 160° C. Oxygen is added until the pressure within the reactor reaches 125 psig (80 psig water pressure and 45 psig oxygen pressure). The mixture is heated at this temperature and pressure for 12 hours whereupon the mixture is cooled, filtered and the residue is washed with 250 parts of water yielding 85.4 parts of residue and 661 parts of filtrate contains 8.26% tungsten indicating that 72% of the tungsten in the soft carbide scrap is recovered.

EXAMPLE 9

One hundred and sixty five parts of dried soft tungsten carbide scrap, 110 parts of a 50% aqueous solution of sodium hydroxide (4 moles per mole of tungsten) and 389 parts of water are charged to an autoclave. The mixture is heated to a temperature of 120° C., and oxygen is added to the autoclave until the pressure within the autoclave is 90 psig (20 psig water pressure and 70 psig oxygen pressure). The mixture is heated at this temperature and pressure for 24 hours whereupon the mixture is cooled, filtered and the residue is washed with 250 parts of water yielding 77.5 parts of residue and 636 parts of filtrate. The filtrate contains 10.7% tungsten indicating that 87% of the tungsten in the tungsten carbide scrap is recovered.

EXAMPLE 10

One hundred and sixty five parts of dried soft tungsten carbide scrap, 110 parts of a 50% aqueous solution of sodium hydroxide (4 moles of sodium hydroxide per mole of tungsten in the scrap) and 389 parts of water are charged to an autoclave, and the mixture is heated to 140° C. Oxygen is added until the pressure within the reactor reaches 85 psig (45 psig of water pressure and 40 psig of oxygen pressure). The mixture then is heated at this temperature and pressure for 24 hours whereupon the mixture is cooled, filtered, and the residue is washed with 250 parts of water yielding 67.5 parts of residue and 690 parts of filtrate. The filtrate contains 9.76% tungsten indicating that 95% of the tungsten in the scrap is recovered.

EXAMPLE 11

One hundred and sixty five parts of dried soft tungsten carbide scrap (as in Example 4), 110 parts of a 50% aqueous solution of sodium hydroxide (4 moles of sodium hydroxide per mole of tungsten) and 389 parts of water are charged to an autoclave. The mixture is heated to a temperature of 160° C., and when this temperature is reached, the autoclave is further pressurized with oxygen. The total pressure within the autoclave reaches 110 psig (80 psig of water pressure and 30 psig of oxygen pressure). The temperature of the mixture increases spontaneously to about 180° C. indicating an exotherm at this high temperature and pressure. The mixture then is heated at about 170° C. with 20 to 30 psig overpressure of oxygen for 24 hours whereupon the mixture is cooled, filtered, and washed with 250 parts of water yielding 69 parts of residue and 656 parts of filtrate. The filtrate contains 10.9% tungsten indicating that 91.4% of the tungsten in the scrap is recovered.

EXAMPLE 12

One hundred parts of crushed hard tungsten carbide scrap (60 mesh screened out) 250 parts of a 50% aqueous solution of sodium hydroxide and 250 parts of water are charged to an autoclave. The mixture is heated to a temperature of 140–150° C. and the autoclave is pressurized to 180 psig with oxygen. The mixture is maintained at this temperature and pressure for 48 hours whereupon the mixture is cooled, filtered, and washed with 384 parts of water yielding to 55 parts of solid residue and 929 parts of a yellow filtrate. The filtrate contains 4.58% tungsten.

EXAMPLE 13

One hundred parts of crushed hard tungsten carbide scrap, 200 parts of a 50% aqueous solution of sodium hydroxide, and 350 parts of water is charged to an autoclave and heated to 170° C. The pressure within the autoclave was increased to 135 psig by adding oxygen (60 psig water pressure and 75 psig oxygen pressure). The mixture is heated at this temperature and pressure for 24 hours whereupon the mixture is cooled, filtered, and washed with 85 parts of water yielding 94 parts of a black solid residue and 471 parts of filtrate which contains the desired sodium tungstate.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for recovering the carbide metal from metal carbide scrap wherein the carbide metal is tungsten, titanium, vanadium, chromium or molybdenum which comprises:
    (A) providing a mixture comprising the metal carbide scrap, water, and at least a stoichiometric amount, based on the amount of metal present in the scrap, of an alkali metal hydroxide,
    (B) heating the mixture in the presence of oxygen at an elevated temperature and pressure for a period of time sufficient to form a water soluble alkali metal salt of the carbide metal, and
    (C) recovering the water soluble alkali metal salt.

2. The process of claim 1 wherein the metal carbide scrap is a tungsten carbide scrap.

3. The process of claim 2 wherein the tungsten carbide scrap is a soft tungsten carbide scrap containing at least one iron group metal.

4. The process of claim 3 wherein the iron group metal is cobalt.

5. The process of claim 1 wherein the alkali metal hydroxide is sodium hydroxide.

6. The process of claim 1 wherein the mixture is heated at a temperature of between about 100° C. and about 200° C.

7. The process of claim 1 wherein the mixture is heated under a pressure of from about 25 to about 200 psig.

8. The process of claim 1 wherein the mixture is heated for a period of from about 10 to about 30 hours.

9. The process of claim 1 wherein the mixture is heated under a pressure of from about 50 to about 125 psig.

10. The process of claim 1 wherein the temperature is in the range of from about 100° C. to about 200° C. and the pressure is from about 25 to about 200 psig.

11. A process for producing an alkali metal tungstate from tungsten carbide scrap which comprises
    (A) providing a mixture comprising the tungsten carbide scrap, water, and at least a stoichiometric amount, based on the amount of tungsten in the scrap, of an alkali metal hydroxide, and
    (B) heating the mixture in the presence of oxygen at an elevated temperature and pressure for a period of time sufficient to form the alkali metal tungstate.

12. The process of claim 11 wherein the tungsten carbide scrap is a soft tungsten carbide scrap containing at least one iron group metal.

13. The process of claim 12 wherein the iron group metal is cobalt.

14. The process of claim 11 wherein the alkali metal hydroxide is sodium hydroxide.

15. The process of claim 11 wherein the mixture is heated at a temperature of between about 100° C. and about 200° C.

16. The process of claim 11 wherein the mixture is heated under a pressure of from about 25 to about 200 psig.

17. The process of claim 11 wherein the mixture is heated for a period of from about 10 to about 30 hours.

18. The process of claim 11 wherein the mixture is heated under a pressure of from about 50 to about 125 psig.

19. The process of claim 11 wherein the temperature is in the range of from about 100° C. to about 200° C. and the pressure is from about 25 to about 200 psig.

20. A process for producing and recovering an alkali metal tungstate from soft tungsten carbide scrap containing at least one iron group metal which comprises
    (A) providing a mixture comprising the soft tungsten carbide scrap containing at least one iron group metal, at least a stoichiometric excess of sodium hydroxide, and water,
    (B) heating the mixture in the presence of oxygen at a temperature of from about 100 to about 200° C. and at a pressure of from about 25 to about 200 psig for a period of time sufficient to form a water soluble portion containing the alkali metal tungstate and a water insoluble portion,
    (C) separating and recovering the soluble alkali metal tungstate portion from the insoluble portion, and
    (D) recovering the alkali metal tungstate.

21. The process of claim 20 wherein the iron group metal is cobalt.

22. The process of claim 20 wherein the alkali metal hydroxide is sodium hydroxide.

23. The process of claim 20 wherein the mixture is heated for a total of from about 10 to about 30 hours.

24. The process of claim 20 wherein the pressure is from about 50 to about 150 psig.

25. The process of claim 20 wherein the mixture provided in (A) contains at least 2 moles of sodium hydroxide per mole of tungsten carbide in the scrap.

* * * * *